(12) United States Patent
Mittal et al.

(10) Patent No.: US 7,501,964 B2
(45) Date of Patent: Mar. 10, 2009

(54) ENTROPY CODING FOR DIGITAL CODECS

(75) Inventors: Sunand Mittal, Ghaziabad (IN);
Laurence Magali Sarti, Tourrettes sur Loup (FR); David Gottardo, Juan les Pins (FR); Jacques Michel Bride, Caille (FR)

(73) Assignee: Texas Instruments Incorporated, Dallas, TX (US)

( * ) Notice: Subject to any disclaimer, the term of this patent is extended or adjusted under 35 U.S.C. 154(b) by 62 days.

(21) Appl. No.: 11/758,121

(22) Filed: Jun. 5, 2007

(65) Prior Publication Data
US 2008/0253443 A1 Oct. 16, 2008

(30) Foreign Application Priority Data
Apr. 16, 2007 (EP) ................... 07290465

(51) Int. Cl.
*H03M 7/00* (2006.01)
(52) U.S. Cl. .................. 341/107; 341/106; 341/59; 341/65; 341/67
(58) Field of Classification Search .................. 341/59, 341/65–67, 106, 107
See application file for complete search history.

(56) References Cited

U.S. PATENT DOCUMENTS

| | | | | |
|---|---|---|---|---|
| 6,124,811 A * | 9/2000 | Acharya et al. | ............... | 341/63 |
| 6,166,664 A * | 12/2000 | Acharya | ....................... | 341/63 |
| 6,300,888 B1 * | 10/2001 | Chen et al. | .................... | 341/63 |
| 6,798,364 B2 * | 9/2004 | Chen et al. | .................... | 341/67 |
| 6,856,701 B2 * | 2/2005 | Karczewicz et al. | ........ | 382/247 |
| 7,123,656 B1 * | 10/2006 | Reznik | ................... | 375/240.18 |
| 7,242,328 B1 * | 7/2007 | Chen et al. | .................... | 341/67 |
| 7,423,562 B2 * | 9/2008 | Kim et al. | .................... | 341/67 |
| 2003/0081850 A1 * | 5/2003 | Karczewicz et al. | ........ | 382/247 |
| 2006/0153424 A1 * | 7/2006 | Hayashi | ..................... | 382/100 |
| 2007/0071102 A1 * | 3/2007 | Wang | .................... | 375/240.18 |

OTHER PUBLICATIONS

ITU-T Telecommunication Standardization Sector Of ITU, Series H: Audiovisual And Multimedia Systems, Infrastructure Of Audiovisual Services—Coding Of Moving Video, Advanced Video Coding For Generic Audiovisual Services, ITU-T Recommendation H.264, Sections 7.3.5.3.1 (p. 38) 7.4.5.3.1 (p. 96), and 9.2 (pp. 198-199), Mar. 2005, 5 pages total.

* cited by examiner

*Primary Examiner*—Linh V Nguyen
(74) *Attorney, Agent, or Firm*—Ronald O. Neerings; Wade James Brady, III; Frederick J. Telecky, Jr.

(57) ABSTRACT

A method and systems are provided for efficiently implementing content adaptive variable length coding on a modern processor. Some embodiments comprise encoding a non-zero coefficient in an array of coefficients in an iteration of an encoding loop. The code value of the encoded non-zero coefficient is determined, at least in part, by the magnitude of another non-zero coefficient in the array of coefficients. A run of zero coefficients preceding a non-zero coefficient in the array of coefficients is also encoded in the iteration of the encoding loop. The encoded non-zero coefficient is appended to an encoded video bitstream when encoded. The encoded run of zero coefficients is stored in a storage device and appended to the encoded video bitstream after all non-zero coefficients in the array of coefficients have been encoded.

21 Claims, 6 Drawing Sheets

ENTROPY CODING FOR DIGITAL CODECS

CROSS-REFERENCE TO RELATED APPLICATIONS

This application claims priority to EPO Patent Application No. 07290465.9, filed on Apr. 16, 2007, incorporated herein by reference.

BACKGROUND

Modern video products and services, such as video capable mobile telecommunications devices, high-definition television broadcasts, internet video, and video recorders, rely on digital video compression. Digital video compression technologies enable transmission and storage of video data by reducing data volume while maintaining various attributes essential to high quality video display.

Digital video compression techniques encompass a variety of methods for reducing the volume of data that must be delivered to reproduce a video display. Removal of redundant information from the video stream reduces the volume of data that must be stored or transmitted without resulting degradation of the reconstructed video. Largely imperceptible information may be removed from the video signal with little or no noticeable loss of quality.

Entropy coding is one technique for removing redundant information from a digital video signal. The coding process endeavors to represent a video signal with as few bits as possible while retaining the information necessary to exactly reconstruct the source video signal. Entropy coding involves elimination of redundant information and representation of necessary information by symbols of the smallest possible average length. Theoretically, the smallest achievable average symbol length that retains all the information necessary to perfectly reconstruct the signal is equivalent to the entropy of the signal. Huffman coding and arithmetic coding are examples of two entropy coding techniques.

Content Adaptive Variable Length Coding ("CAVLC"), as disclosed in ITU-T H.264 which is hereby incorporated by reference, is an entropy coding technique employed in modern digital video encoders. The CAVLC algorithm takes advantage of the fact that power in a quantized transformed pixel block tends to be concentrated in the lower frequencies. CAVLC adapts by selecting a variable length code ("VLC") table, for coding non-zero coefficients ("levels") based on the magnitude of recently coded levels. The algorithm's reliance on previously encoded levels tends to give the algorithm a sequential character. Similarly, the number of zero coefficients in each run, where a run is a contiguous string between two levels ("run before"), is encoded based on the number of zero coefficients remaining to be coded in the block. CAVLC also exploits the fact that sequences of ones dominate the levels at the tail of a zigzag reordered quantized coefficient block. CAVLC specially encodes up to three trailing one coefficients ("T1"), thus not all non-zero coefficients are encoded in the same manner.

Such aspects of CAVLC result in high coding efficiency, but also introduce substantial complexity to the coding process. Modern processors rely on extensive pipelining and multiple execution units to achieve high levels of performance. The sequential nature of encoding level and run before limit the opportunities for parallelization of the algorithm, thus limiting performance on processor architectures implementing parallel execution units, such as very long instruction word architectures. The numerous control transfers resulting from conditionals in the CAVLC algorithm cause pipeline breaks that further impair performance on modern processors.

SUMMARY

Accordingly, there are herein disclosed methods and systems for efficient CAVLC encoding on a modern processor. Some embodiments provide a method that includes encoding a non-zero coefficient in an array of coefficients in an iteration of an encoding loop. The code value of the encoded non-zero coefficient is determined, at least in part, by the magnitude, prior to encoding, of another non-zero coefficient in the array of coefficients. A run of zero coefficients preceding a non-zero coefficient in the array of coefficients may also be encoded in the iteration of the encoding loop. The encoded non-zero coefficient and run of zero coefficients are appended to an encoded video bitstream.

Some embodiments provide a system that includes a level/run before encoder that encodes an array of coefficients. The encoder is configured to iteratively encode coefficients in the array of coefficients. An iteration of an encoding loop encodes a non-zero coefficient and encodes a run of zero coefficients preceding a non-zero coefficient. The level/run before encoder is configured to determine a code value of the non-zero coefficient based, at least in part, on the magnitude of another non-zero coefficient in the array of coefficients.

Some embodiments provide a system including a processor and an encoder software system configured to execute on the processor. The encoder software system includes a level/run before encoder, and the level/run before encoder is configured to encode an array of coefficients by iteratively executing an encoding loop. An iteration of the encoding loop encodes a non-zero coefficient and encodes a run of zero coefficients preceding a non-zero coefficient. The level/run before encoder is also configured to adaptively encode the non-zero coefficient based on the magnitude of another non-zero coefficient in the array of coefficients.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for efficiently entropy coding video data. The disclosed embodiments include a method for efficiently entropy coding video data, a system for efficiently entropy coding video data, as well as a system for efficiently entropy coding video data using a modern processor comprising multiple execution units, such as a VLIW processor or a general superscalar processors.

Figure 1:
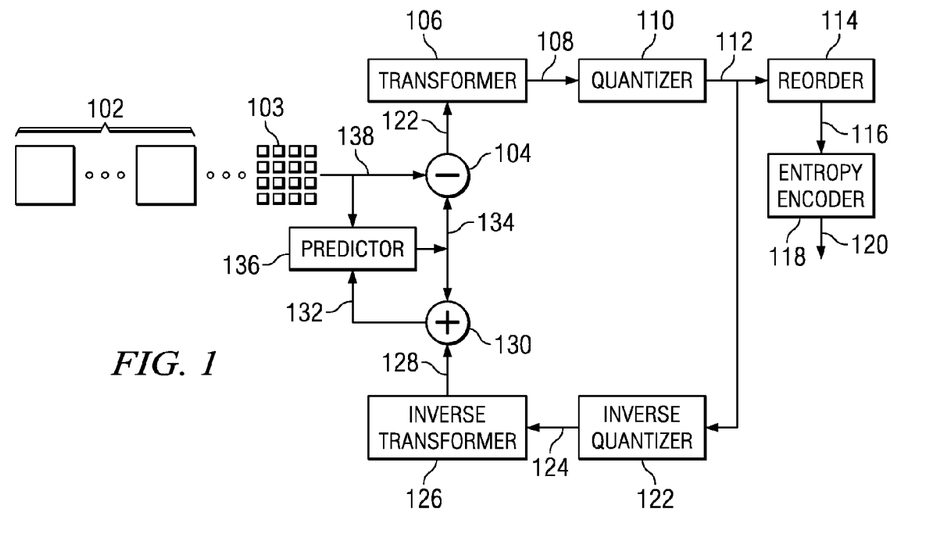
FIG. 1 shows a block diagram of an illustrative video compression system.

FIG. 1 shows an illustrative video compression system. Video data is presented to the system as video frames 102, which are further subdivided into macroblocks 103 which may, for example, be 16×16 arrays of pixels. The macroblocks are processed by the predictor 136. Predictor 136 may use previously encoded and decoded samples of the current frame to generate a prediction macroblock signal 134. Alternatively, predictor 136 may use one or more previously encoded and decoded frames to generate prediction macroblock signal 134, for example when performing motion prediction. However generated, prediction macroblock signal 134 is subtracted from the input macroblock signal 138 in subtraction node 104, to form residual signal 122. Transformer 106 decorrelates residual signal 122 by applying, for example, a 4×4 integer transform or a discrete cosine transform to produce an array of transform coefficients 108. Quantizer 110 further processes the array of transform coefficients 108 produced by transformer 106. Quantization eliminates unnoticeable high frequency components from the video signal, and decreases the number of coefficient values to be encoded, thus increasing the opportunity for compression. Information discarded in quantization is not recoverable.

The quantized transform coefficients 112 are processed and fed back into the predictor 136. Inverse quantizer 122 rescales the quantized transform coefficients 112 to produce approximate transform coefficients 124. Coefficients zeroed by quantizer 110 can not be reconstructed by inverse quantizer 122. Moreover, any quantizer 110 rounding of transform coefficients 108 is not recoverable. Inverse transformer 126 applies the inverse of the transform applied by transformer 106 to the approximate transform coefficients 124 to produce residual approximation 128. Residual approximation 128 is added to the prediction macroblock signal 134 in summation node 130 and fed back into predictor 136 as reconstructed macroblock 132 for use in the prediction process.

Reorder component 114 resequences the quantized transform coefficients 112 produced by quantizer 110. The quantized coefficients 112 are resequenced to maximize the number of consecutive zero coefficients, thus making the coefficient array more amenable to compression. The coefficients may be reordered by, for example, a zigzag scan. Finally, the entropy encoder 118 codes the quantized transform coefficients to reduce the average size of the symbols representing the coefficients. The encoded coefficients when combined with other information, such as predictor mode, and quantizer step size, form the compressed video bitstream 120 that may be transmitted or stored before being decoded for viewing. Note that a bitstream is a sequence of binary digits.

Figure 2A:
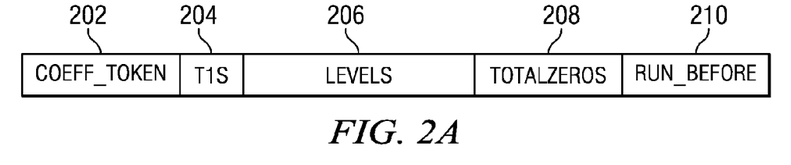
FIG. 2A shows an illustrative portion of a CAVLC bitstream resulting from residual block encoding.

In a modern video compression system, entropy encoder 118, may implement the CAVLC technique. FIG. 2A illustrates a portion of a bitstream generated by CAVLC residual block encoding. The first value encoded in the bitstream is coeff_token 202, which includes the number of non-zero coefficients in the block and the number of trailing one coefficients in the block (up to a maximum of three).

Figure 2B:
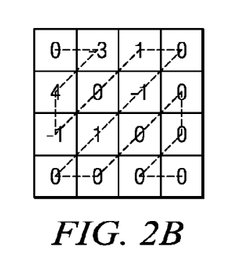
FIG. 2B shows as an illustrative 4×4 quantized block of video coefficients.
Figure 2C:
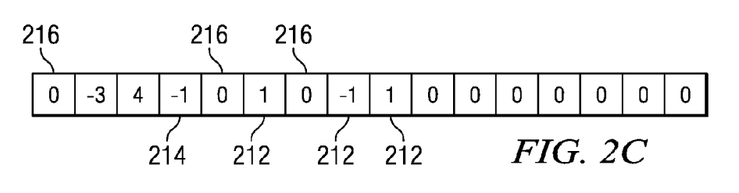
FIG. 2C shows the coefficients of FIG. 2B reordered in zigzag sequence.

Note that all references to block coefficient ordering assume a block whose coefficients have been reordered in zigzag sequence, although it is understood that other sequences may be used to achieve a similar result. Note further, that the reordered block coefficients may be referred to a as a "reordered array" of coefficients. FIG. 2B shows an illustrative 4×4 block of quantized video coefficients. The dashed line illustrates the zigzag sequencing that may be applied to reorder the block coefficients. FIG. 2C illustrates the coefficients of the block of FIG. 2B reordered in zigzag sequence.

Up to three one magnitude coefficients found at the end of the reordered array, trailing ones or T1s 204, follow coeff_token in the bitstream. Note T1s 212 in FIG. 2C. While there are four one magnitude coefficients at the end of the reordered array, only the three coefficients signified by 212 may be encoded as T1s. Each T1 204 is encoded as a sign bit. T1 are encoded in reverse order, with the T1 closest to the end of the reordered array encoded first and the T1 closest to the start of the array encoded last. Encoded levels 206 are next appended to the encoded bitstream. Levels are also encoded in reverse order, beginning with the level preceding the last encoded T1 and proceeding toward the start of the array. Referring to FIG. 2C, 214 indicates the first level encoded. After levels 206, TotalZeros 208 are inserted into the bitstream. TotalZeros 208 includes the total number of zeros between the start of the reordered array and the last level in the reordered array. Referring again to FIG. 2C, 216 denotes zero coefficients relevant to TotalZeros. Finally, run_before 210 is appended to the bitstream. The bitstream contains a run_before code for each encoded level, the run_before code indicating the number of zero coefficients preceding the associated level. Like T1 and level, run_before is encoded in reverse order, beginning with the zero run preceding the last non-zero coefficient in the array and ending with the zero run preceding the second non-zero coefficient. A zero run preceding the first non-coefficient in the array is not encoded. The ordering of the bitstream parameters in conjunction with the dependencies resulting from context adaptation lead to sequential encoding processes that may not be efficiently implemented on modern processors.

Figure 2D:
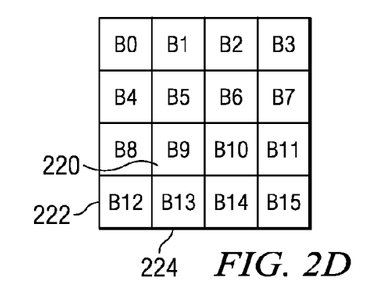
FIG. 2D shows the relationship of blocks affecting coeff_token variable length code table selection.
Figure 3A:
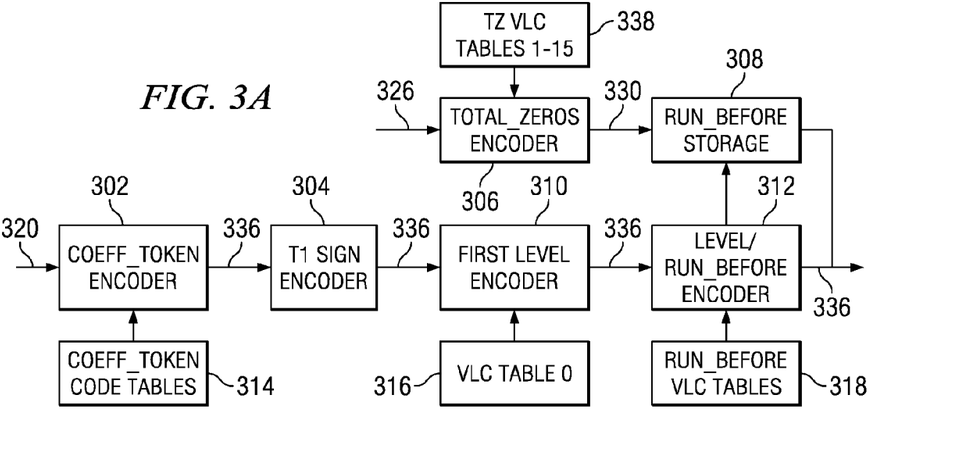
FIG. 3A shows a block diagram of an illustrative CAVLC entropy coding system in accordance with at least some embodiments of the invention.

FIG. 3A shows an illustrative embodiment of a CAVLC system for encoding residual blocks that is adapted for efficient implementation on modern processors in accordance with embodiments of the present disclosure. An array of zigzag ordered quantized transform coefficients 320 is to be encoded. The coeff_token encoder 302, encodes the sum of the number of non-zero coefficients and the number of trailing one coefficients (up to three). A code table 314 is selected for encoding coeff_token based on the content of previously processed blocks. Specifically, the number of non-zero coefficients found in the block to the left of, and in the block above the instant block is considered when selecting the code table. For example, FIG. 2D represents a 16×16 macroblock decomposed into sixteen 4×4 pixel blocks. When encoding block B13 224 a code table 314 is selected based on the number of non-zero coefficients in blocks B12 222 and B9 220. A code value is read from the selected table 314 to represent coeff_token, and the encoded value of coeff_token is added to the encoded bitstream 336.

The T1 sign encoder 304 next appends the signs of up to three trailing one coefficients to the encoded bitstream. Each sign is encoded by a single bit, with the T1 nearest the end of the reordered array encoded first, and appended to the encoded bitstream 336.

First level encoder 310 encodes the level nearest the end of the array not coded as a T1. In one embodiment, first level encoder 310 employs a unique level VLC table 0 316 and a VLC generation algorithm to produce prospective first level codes. Depending on the magnitude of the level to be encoded and as previously delineated, the levels and T1s in the array, either the table generated or the algorithmically generated code will be selected and appended to the bitstream. Because the operations resulting from the conditional selecting either the algorithmically generated or the table generated code are simple assignments, the operations may be implemented without a pipeline break, for example, by conditional instruction execution rather than a change in program flow. The selected code value is appended to the encoded bitstream 336. By reducing pipeline breaks, the present embodiment of a first level converter 310 is adapted for efficient implementation on modern processors.

Figure 4:
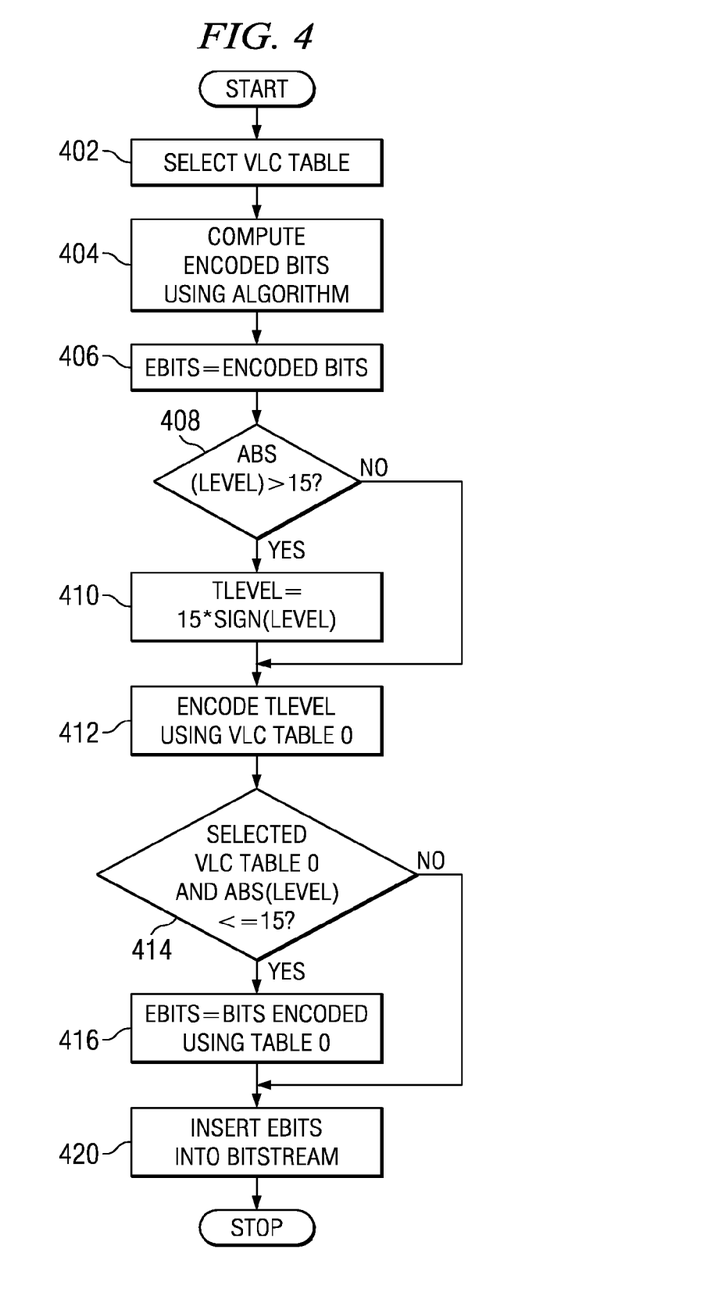
FIG. 4 shows a flow diagram for a CAVLC first level entropy coding method in accordance with at least some embodiments of the invention.

FIG. 4 shows a flow diagram of an illustrative method for first level encoding as exemplified by the embodiment of first level encoder 310. In block 402, a level VLC table is selected for use in encoding the first level. Level VLC table 0 is selected unless there are more than ten levels and fewer than three T1s in the residual array being encoded, in which case level VLC table 1 is selected. Level VLC table 0 used in this embodiment may be a modified subset of the level VLC table 0 used in a conventional embodiment because the table need comprise only codes levels zero and +/−1 though +/−15. All other levels may be algorithmically encoded. See Table 1 below. In block 404, the first level may be encoded using the algorithm disclosed in FIG. 7, and the resultant code is stored in temporary storage location EBITS in block 406. If the first level magnitude is greater than fifteen in block 408, then the level value to be table encoded is limited to a magnitude of fifteen in block 410. In block 412, a code value for encoding the magnitude limited level is read from level VLC table 0.

Selection of either the algorithmically generated or the table generated code to represent the level begins in block 414. If level VLC table 0 was selected in block 402, and the level being encoded is of magnitude 15 or lower, then, in block 416, the code value read from level VLC table 0 in block 412 is stored in temporary storage location EBITS. Thus the table generated code replaces the algorithmically generated code previously stored in EBITS at block 406. The code value stored in temporary storage location EBITS is appended to the encoded bitstream in block 420.

The conditional operations of the present embodiment of a first level encoding method, as illustrated in blocks 408, 414, may be implemented without causing pipeline breaks on a modern processor, thereby providing improved algorithmic performance over alternative embodiments employing conditionals causing pipeline breaks.

TABLE 1

First Level VLC0 Table

| Level | Code |
|---|---|
| 0 | 0 |
| 1 | 1 |
| −1 | 01 |
| 2 | 001 |
| −2 | 0001 |
| 3 | 00001 |
| −3 | 000001 |
| 4 | 0000001 |
| −4 | 00000001 |
| 5 | 000000001 |
| −5 | 0000000001 |
| 6 | 00000000001 |
| −6 | 000000000001 |
| 7 | 0000000000001 |
| −7 | 00000000000001 |
| 8 | 0000000000000010000 |
| −8 | 0000000000000010001 |
| 9 | 0000000000000010010 |
| −9 | 0000000000000010011 |
| 10 | 0000000000000010100 |
| −10 | 0000000000000010101 |
| 11 | 0000000000000010110 |
| −11 | 0000000000000010111 |
| 12 | 0000000000000011000 |
| −12 | 0000000000000011001 |
| 13 | 0000000000000011010 |
| −13 | 0000000000000011011 |
| 14 | 0000000000000011100 |
| −14 | 0000000000000011101 |
| 15 | 0000000000000011110 |
| −15 | 0000000000000011111 |

Referring again to FIG. 3A, total_zeros encoder 306 encodes the total number of zeros between the start of the reordered array and the last level in the array. Based on the number of levels in the array, the total zeros encoder 306 reads a code value from one of fifteen total zeros VLC tables 338. The resultant code value is not immediately appended to the bitstream 336, but is instead stored in storage array run_before storage 308, for insertion into the encoded bitstream 336 following completion of level encoding. By storing the encoded total_zeros value for subsequent insertion into the bitstream, rather than generating the code at a point where it must be immediately inserted into the bitstream, the computation of total_zeros is decoupled from other algorithmic operations. Total_zeros may be computed at any point optimizing parallelism, thus enabling efficient implementation on modern processors.

Level/run_before encoder 312 encodes all the levels in the array, other than the first which is encoded by the first level encoder 310, and the T1s which are encoded by the T1 sign encoder 304. Level/run_before encoder 312 also encodes the number of sequential zero valued coefficients preceding each level in the array. Level encoding begins with the level nearest the end of the array not yet coded. Some embodiments of level/run_before encoder 312 encode levels algorithmically, rather than by table look-up. Each level is appended to the encoded bitstream 336 as encoded.

Zero run encoding begins with the zero run preceding the level nearest the end of the array. Level/run_before encoder 312 encodes the number of zero valued coefficients preceding each level in the array by reading a code value from one of seven run_before VLC code tables. A table is selected based on the number of zero runs in the array not yet encoded. The code value read from the table is not appended to the bitstream 336, but is instead stored in run_before storage 312. After level and run_before encoding is complete, the code values written into run_before storage are appended to the bitstream 336. The encoded video bitstream 336 may be, for example, transmitted to another location for remote decoding and viewing, or recorded onto a storage medium for future replay.

Storing encoded run_before values for subsequent insertion into the bitstream allows integration of level and run_before processing. This integration provides an opportunity to increase parallelization, and thus increase the efficiency of implementation on modern processors. Note that efficient temporary storage of the total number of zeros in the array and of zero runs is facilitated by the fact that the total length of code values required for their encoding is less than or equal to thirty-two bits for a 4×4 coefficient block. Thus, the encoded values may be temporarily stored in an on-chip register, with encoded zero runs appended to the register by simple binary shift and OR operations.

Some embodiments of level/run_before encoder 312 execute a total number of level/run_before encoding iterations equal to one less than the total number of levels in the coefficient array. Because a zero run at the start of the coefficient array need not be encoded, the maximum number of zero runs preceding a level that must be encoded is one less than the total number of levels in the array. Likewise, because one level is always encoded by the first level encoder 310, the maximum number of levels processed by encoder 312 is one less than the number of levels in the coefficient array. The number of levels encoded by the encoder 312 is the total number of levels in the array less the number of levels encoded by T1 sign encoder 304 and first level encoder 310. Encoder 312 recognizes levels encoded by encoders 310, 304, and appends no code values to the bitstream for those levels. Encoder 312 does generate and store run_before codes values for previously encoded levels.

Figure 3B:
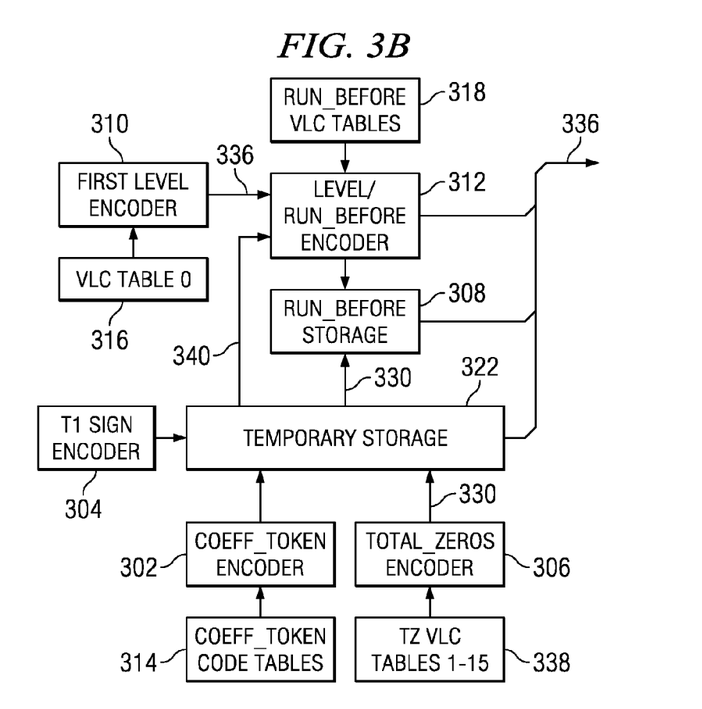
FIG. 3B shows a block diagram of an illustrative CAVLC entropy coding system in accordance with at least some preferred embodiments of the system.

FIG. 3B shows an alternative illustrative embodiment of a CAVLC system for encoding residual blocks in accordance with embodiments of the present disclosure. This embodiment further separates the computation of residual block data values, such as the total number of zeros and the total number of levels, from the encoding of residual block pixels. Separating pixel and non-pixel processing serves to isolate conditional laden control functions outside of the core pixel processing functions, resulting in fewer pipeline breaks in the pixel encoder. Moreover, pixel encoding is further enhanced by reducing the number of variable length code table accesses required within the pixel encoder An array of zigzag ordered quantized transform coefficients is to be encoded. The coeff_token encoder 302 encodes the number of non-zero coefficients and the number of trailing one coefficients (up to three) in the array. A code table 314 is selected for encoding coeff_token based on the content of previously processed blocks. A code value is read from the selected table 314 to represent coeff_token, and the encoded value of coeff_token is stored in temporary storage 322 for later insertion into the encoded bitstream 336.

The T1 sign encoder 304 encodes the signs of up to three trailing one coefficients. Each sign is encoded by a single bit, with the T1 nearest the end of the reordered array encoded first. The encoded T1 value is stored in temporary storage for later insertion into the encoded bitstream 336.

Total_zeros encoder 306 encodes the total number of zeros between the start of the reordered array and the last level in the array. Based on the number of levels in the array, the total zeros encoder 306 reads a code value from one of fifteen total zeros VLC tables 338. The resultant code value 330 is stored in temporary storage 322, and later transferred to run_before storage 308 before being appended to the encoded bitstream 336 following level encoding. Note that in some embodiments total_zeros encoder 306 may store code value 330 in run_before storage 308 rather than temporary storage 322.

Those skilled in the art will recognize that a variety of data values 340 useful to level/run_before encoder 312, for example run_before_mask, number of residual blocks to process, etc., may be stored in temporary storage 322 and accessed by level/run_before encoder 312 to accelerate residual pixel encoding.

The first level encoder 310 and the level/run before encoder 312 function as described above in connection with FIG. 3A.

Figure 5A:
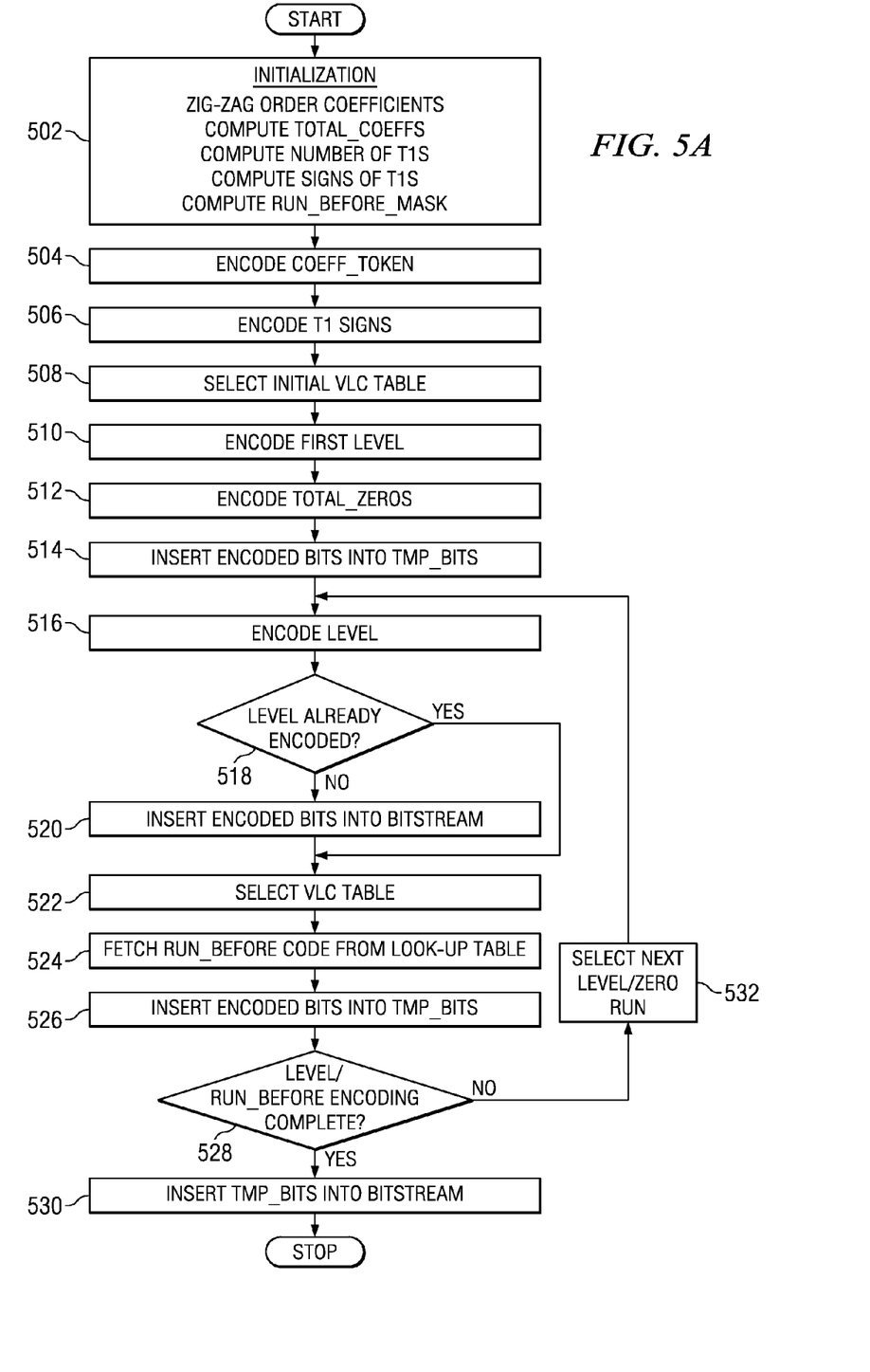
FIG. 5A shows a flow diagram for a CAVLC entropy coding method in accordance with at least some embodiments.

FIG. 5A shows a flow diagram of an illustrative method for CAVLC encoding adapted for efficient implementation on a modern processor. In block 502, block encoding is initialized. Initialization comprises resequencing the coefficients in zig-zag order to produce a reordered array, computing the total number of non-zero coefficients in the block ("total_coeffs"), computing the number of unity valued coefficients (to a maximum of three) at the end of the reordered array ("T1"), computing the sign value of each T1, and computing run_before_mask, a bit array indicating where zeros are located in the reordered array. Following initialization, coeff_token is encoded and appended to the encoded bitstream in block 504. Coeff_token encodes total_coeffs and the number of T1s. Based on the number of non-zero coefficients found in the block to the left of, and the block above the current block, one of four code tables is selected, and a code value is read from the selected table to represent coeff_token. The encoded value of coeff_token is appended to the encoded bitstream.

In block 506, the signs of up to three trailing ones (T1s) are encoded. A negative one is encoded as a '1,' and a positive one is encoded as a '0.' The sign values are appended to the bitstream.

An initial VLC table is selected in block 508. If there are more than ten non-zero coefficients and fewer than three T1s in the reordered array, then table VLC1 is selected, otherwise table VLC0 is selected.

In block 510, the first non-T1 level is encoded. This level may be the level preceding the T1 in the reordered array or the last level in the reordered array when the array contains no T1s. The level is encoded and appended to the bitstream. The first level may be encoded in accordance with the method of FIG. 4, as disclosed herein, to reduce pipeline breaks due to conditionals and to increase opportunities for parallelization.

Total_zeros, the total number of zeros between the start of the reordered array and the last level in the reordered array is encoded in block 512. Fifteen VLC tables are available for total_zeros coding. A table is selected based on the number of levels in the block. A code value read from the selected VLC table is stored in a temporary storage location (TMP_BITS), in block 514, for insertion into the bitstream after completion of level and run_before encoding.

Level and run_before encoding starts in block 516, where a level is encoded. The code value corresponding to the level may be computed using the algorithm illustrated in FIG. 7. Whether the level was previously encoded, as a T1 in block 506, or as the first encoded level in block 510, is determined in block 518. If the level was not previously encoded, then the level is appended to the bitstream in block 520. In an alternative embodiment, level encoding begins with the unencoded level nearest the end of the reordered array, and the initial VLC table selection in block 508 considers the magnitude of the first level encoded in block 510 when selecting the table.

In block 522, a VLC table number is selected for encoding the subsequent level. The pre-encoding magnitude of the encoded level is compared to a threshold value associated with the VLC table. If the magnitude of the level exceeds the VLC table threshold, the VLC table number is incremented causing the next level to be encoded using the next higher VLC table. Thus the level encoding adapts according to the magnitude of the previously encoded levels. Note that when algorithmically encoding levels, although the tables are not used, the index of the table is maintained for use by the adaptive algorithm.

Run_before is processed in block 524. The run_before_mask is parsed to determine whether a zero coefficient is to be processed. The number of preceding zeros is determined and a code value is read from one of seven run_before look-up tables. Table selection is based on the number of zero runs remaining to be encoded. The selected code value is stored in temporary storage location TMP_BITS. The contents of TMP_BITS will be appended to the encoded bitstream after completion of level and run_before encoding. Storing encoded run_before values for later insertion into the bitstream, rather than encoding run_before at a point where the values must be written into bitstream, circumvents the sequential structure of the CAVLC algorithm. Level and run_before processing may thus be parallelized, resulting in efficient implementation of CAVLC on modern processors.

Level and run_before processing is checked for completion in block 528. When all levels and zero runs are encoded, the contents of TMP_BITS, which comprises total_zeros encoded in block 512 and run_before encoded in block 524, are appended to the encoded bitstream in block 530 to complete block encoding. If, in block 528, levels or zero runs remain to be encoded, then the next unencoded level/zero run in the reordered array is selected in block 532 and encoding proceeds in block 516.

Figure 5B:
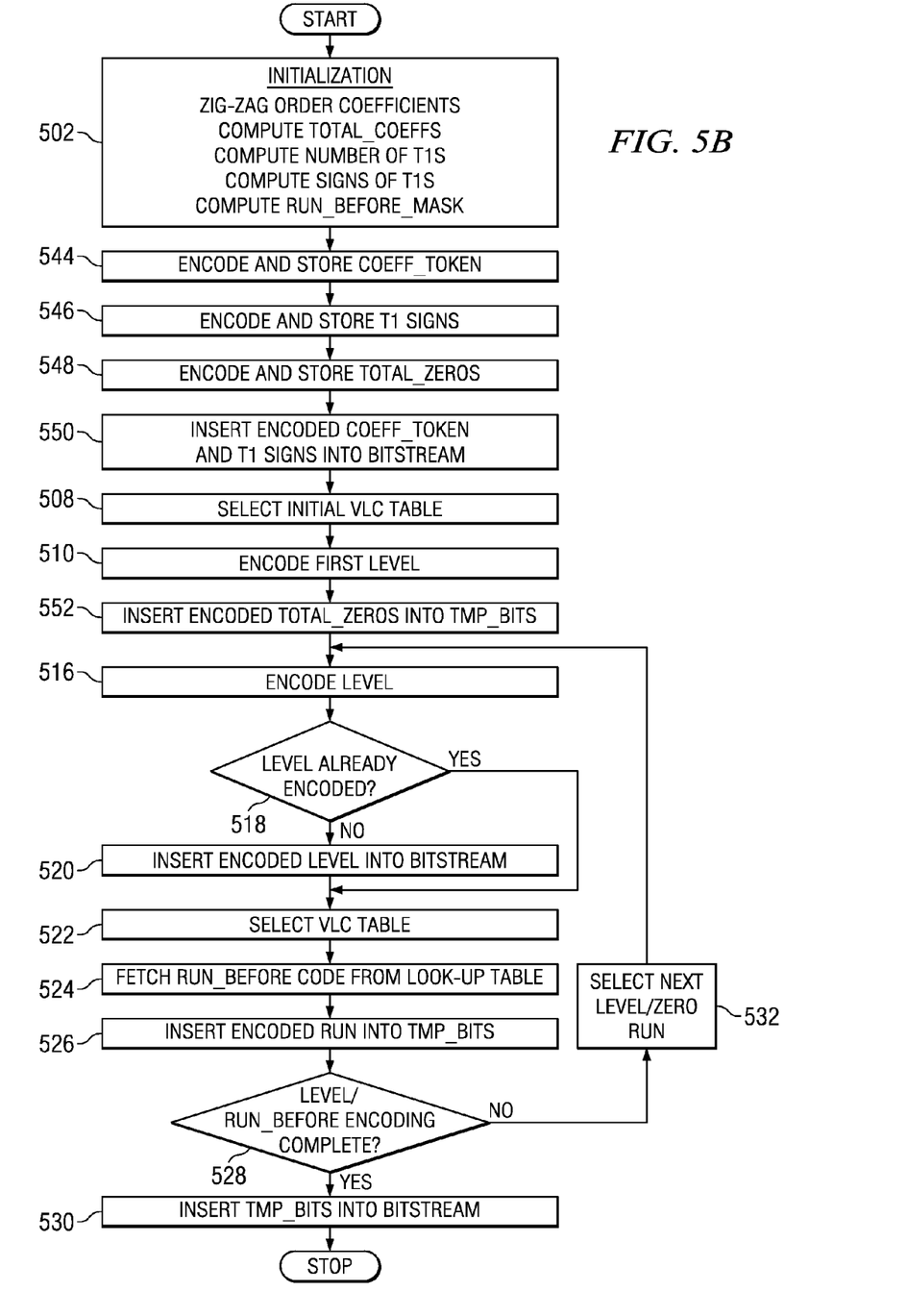
FIG. 5B shows a flow diagram for a CAVLC entropy coding method in accordance with at least some of the preferred embodiments.

The encoded video bitstream generated by the methods of FIG. 5A or FIG. 5B may be, for example, transmitted to another location for remote decoding and user viewing, or recorded onto a storage medium for replay by users in the future.

FIG. 5B shows a flow diagram of an alternative illustrative method for CAVLC encoding in accordance with embodiments of the invention. The embodiment of FIG. 5B separates the computation of residual block data related values involving numerous conditionals, such as coeff_token and total_zeros, from encoding of residual pixels. Such separation serves to accelerate pixel processing by reducing the number of pipeline breaks and variable length code table accesses occurring during pixel encoding.

In block 502, block encoding is initialized. Initialization comprises resequencing the coefficients in zigzag order to produce a reordered array, computing the total number of non-zero coefficients in the block ("total_coeffs"), computing the number of unity valued coefficients (to a maximum of three) at the end of the reordered array ("T1"), computing the sign value of each T1, and computing run-before_mask, a bit array indicating where zeros are located in the reordered array. Following initialization, in block 544, coeff_token, which encodes total_coeffs and the number of T1s, is encoded and stored in a temporary storage location (PBUF) for later insertion into the encoded bitstream.

In block 546, the signs of up to three trailing ones (T1s) are encoded. A negative one is encoded as a '1,' and a positive one is encoded as a '0.' The sign values are stored in a temporary storage location (PBUF) for later insertion into the encoded bitstream.

Total_zeros, the total number of zeros between the start of the reordered array and the last level in the reordered array is encoded in block 548. The encoded value is stored in a temporary storage location (PBUF). Fifteen VLC tables are available for total_zeros coding. A table is selected to encode total_zeros based on the number of levels in the block.

In block 550, encoded coeff_token and the T1s signs, respectively, are retrieved from temporary storage (PBUF) and appended to the encoded bitstream.

An initial VLC table is selected in block 508. If there are more than ten non-zero coefficients and fewer than three T1s in the reordered array, then table VLC1 is selected, otherwise table VLC0 is selected.

In block 510, the first non-T1 level is encoded. This level may be the level preceding the T1 in the reordered array or the last level in the reordered array when the array contains no T1s. The level is encoded and appended to the bitstream. The first level may be encoded in accordance with the method of FIG. 4, as disclosed herein, to reduce pipeline breaks due to conditionals and to increase opportunities for parallelization.

Encoded total_zeros is read from temporary storage (PBUF) and inserted into TMP_BITS in block 552. TMP_BITS stores encoded values to be appended to the encoded bitstream after completion of level and run before encoding.

Level and run_before encoding starts in block 516, where a level is encoded, and proceeds as disclosed above in connection with FIG. 5A.

The encoded video bitstream generated by the methods of FIG. 5A or FIG. 5B may be, for example, transmitted to another location for remote decoding and user viewing, or recorded onto a storage medium for replay by users in the future.

Figure 6:
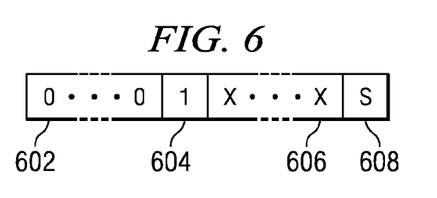
FIG. 6 shows an illustrative CAVLC level code.

FIG. 6 shows an illustrative CAVLC level code. The code illustrates the form of codes contained in level VLC tables one through seven. The code begins with a zeros field 602, which may be zero or more bits in length. Field 604 contains a single one bit. A variable value field 606 follows the single one of field 604. A sign bit 608 completes the code wherein zero and one indicate positive and negative levels respectively.

Figure 7:
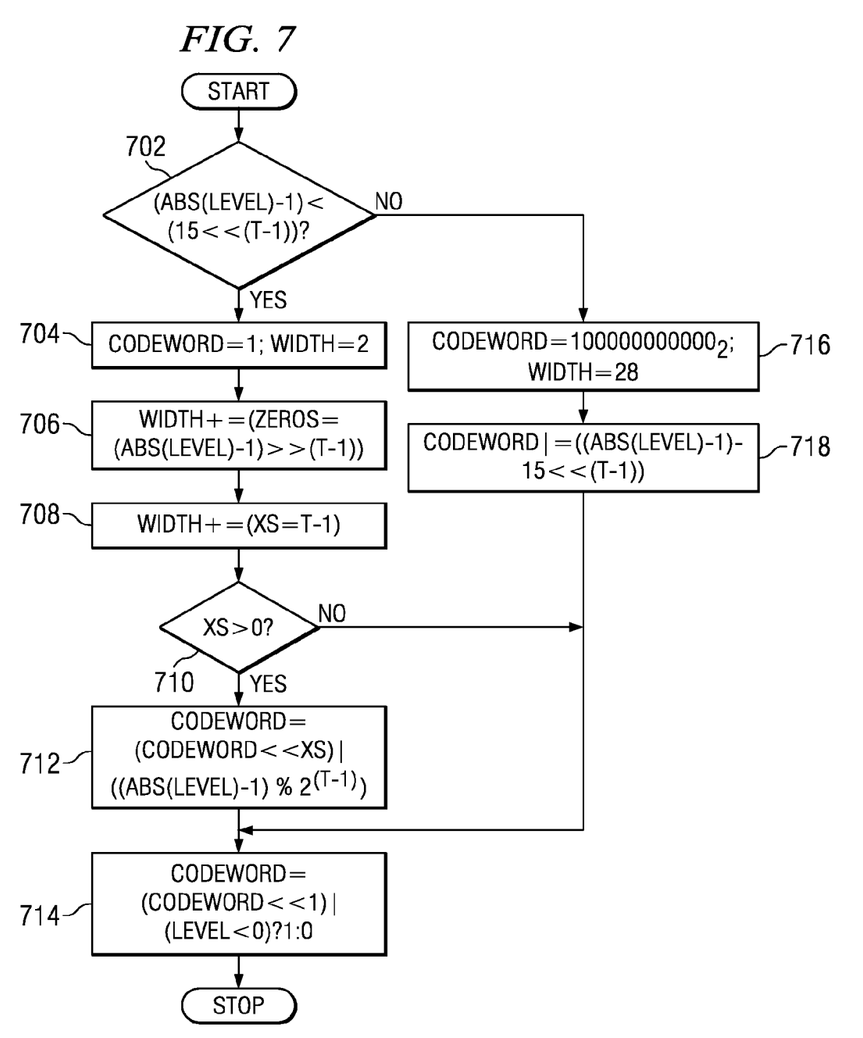
FIG. 7 shows a flow diagram for an illustrative CAVLC level code computation algorithm in accordance with at least some embodiments.

FIG. 7 shows a flow diagram of an illustrative method for computing a level code value of the form illustrated in FIG. 6. Rather than read a code value from one of level VLC tables one through seven, some embodiments may employ the algorithm FIG. 7 to generate a variable length level code. In block 702, if one less than the absolute value of the level being encoded is found to be less than the value resulting from applying one fewer than T left shifts to the integer fifteen, then initialization occurs in block 704. T is taken to be the number (1-7) of the VLC table used to encode the level. In block 704, CODEWORD is set to one, and WIDTH is set to 2. WIDTH indicates the number of bits in CODEWORD as the code is built. At initialization WIDTH includes the one field 604 and the sign field 608.

The number of leading zeros 602 in CODEWORD is computed in block 706. One fewer than T right shifts is applied to one less than the absolute value of the level being encoded to generate the number of leading zeros 602. WIDTH is updated to reflect the result of the computation.

In block 708, the width of the variable field 606 is computed. Field 606 contains T minus one bits. WIDTH is updated accordingly. If the variable field 606 has width greater than zero in block 710, then the variable field 606 value is computed in block 712 and inserted into CODE-WORD. The field 606 value is computed by first taking one less than the absolute value of the level being encoded, then taking that result modulo two raised to the power of T minus one. CODEWORD is left shifted by the width of the variable field computed in block 708 and the variable value inserted into CODEWORD.

The sign bit (field 608) is appended to CODEWORD in block 714. CODEWORD is left-shifted by one bit and the sign value is inserted to complete the code.

When the test of block 702 yields a negative result, a twenty-eight bit escape sequence is generated to encode the level. In block 716, the escape sequence is initialized by setting CODEWORD to $100000000000_2$ and WIDTH to 28. The eleven zeros following the single one 604 in the initialized CODEWORD represent the variable field 606. Fifteen bits of zeros to the left of the single one 604 are also included in CODEWORD as field 602. The variable field value 606 is computed and inserted into CODEWORD in block 718. The field value is computed by subtracting fifteen left shifted T minus one times from one less than the absolute value of the level being encoded. Finally, the sign of the level encoded is inserted into CODEWORD (field 608) in block 914.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, while the illustrated embodiments have been described primarily in the context of software implementations for modern processors, such as superscalar processors, VLIW processors, and heavily pipelined processors, the disclosed embodiments are also applicable to accelerating CAVLC processing in hardware implementations. Accordingly, the scope of protection is not limited to the embodiments described herein, but is only limited by the claims which follow, the scope of which shall include all equivalents of the subject matter of the claims.

What is claimed is:

1. A method comprising:
   encoding a non-zero coefficient in an array of coefficients in an iteration of an encoding loop, wherein a code value of the encoded non-zero coefficient is determined, at least in part, by the magnitude of another non-zero coefficient in the array of coefficients;
   encoding a run of zero coefficients preceding a non-zero coefficient in the array of coefficients in the iteration of the encoding loop; and
   appending the encoded non-zero coefficient and encoded run of zero coefficients to an encoded video bitstream.

2. The method of claim 1, further comprising accelerating the encoding loop by encoding, outside the encoding loop, a count of the total number of non-zero coefficients in the array of coefficients, up to three one magnitude coefficients in the array of coefficients, and a count of the total number of zero coefficients preceding the last non-zero coefficient in the array of coefficients;
   storing the encoded values;
   appending the stored encoded values to an encoded video bitstream.

3. The method of claim 1, further comprising encoding a first non-zero coefficient in the array of coefficients by reading a code value from a variable length code table when the magnitude of the first non-zero coefficient is less than or equal to a threshold and encoding the first non-zero coefficient by execution of an encoding algorithm when the magnitude of the first non-zero coefficient is greater than the threshold.

4. The method of claim 1, further comprising storing the encoded run of zero coefficients; wherein the stored encoded run of zero coefficients is appended to the encoded video bitstream after all non-zero coefficients in the array of coefficients have been encoded and appended to the encoded video bitstream.

5. The method of claim 1, further comprising:
   encoding a count of the total number of zero coefficients preceding the last non-zero coefficient in the array of coefficients,
   storing the count of the total number of zeros coefficients, and
   appending the stored count of the total number of zeros coefficients to the encoded video bitstream after all non-zero coefficients in the array of coefficients have been encoded and appended to the encoded video bitstream.

6. The method of claim 1, wherein the number of encoding loop iterations required to encode runs of zero coefficients in the array of coefficients is one less than the number of non-zero coefficients in the array.

7. A system comprising:
   a level/run before encoder that encodes an array of coefficients, wherein the encoder is configured to iteratively encode coefficients in the array of coefficients; wherein an iteration of an encoding loop encodes a non-zero coefficient and encodes a run of zero coefficients preceding a non-zero coefficient, and
   the level/run before encoder is further configured to determine a code value of the non-zero coefficient based, at least in part, on the magnitude of another non-zero coefficient in the array of coefficients.

8. The system of claim 7, further comprising:
   a trailing ones encoder that encodes up to three one magnitude coefficients in the array of coefficients;
   a coeff_token encoder that encodes a number of non-zero coefficients in the array of coefficients and encodes the number of one magnitude coefficients encoded by the trailing ones encoder;
   a total zeros encoder that encodes a total number of zero coefficients located in the array of coefficients between the start of the array of coefficients and the last non-zero coefficient in the array of coefficients; and
   a block data storage array that stores the encoded output of the trailing ones encoder, the coeff_token encoder, and the total_zeros encoder.

9. The system of claim 7, further comprising a run before storage array coupled to the level/run before encoder, wherein the run before storage array stores the encoded run of zero coefficients.

10. The system of claim 9, wherein the level/run before encoder, in an iteration of the encoding loop, appends the encoded non-zero coefficient to an encoded video bitstream, and stores the encoded run of zero coefficients in the run before storage array.

11. The system of claim 10, wherein the encoded run of zero coefficients is read from the run before storage array and appended to the encoded video bitstream after all non-zero coefficients in the array of coefficients have been encoded and appended to the encoded video bitstream.

12. The system of claim 9, further comprising a total zeros encoder coupled to the run before storage array, wherein the total zeros encoder encodes a total number of zero coefficients located in the array of coefficients between the start of the array of coefficients and the last non-zero coefficient in the array of coefficients, and wherein the encoded total number of zero coefficients is stored in the run before storage array.

13. The system of claim 12, wherein the encoded total number of zero coefficients is read from the run before storage array and appended to the encoded video bitstream after all non-zero coefficients in the array of coefficients have been encoded and appended to the encoded video bitstream.

14. The system of claim 7, further comprising a first level encoder that encodes a first non-zero coefficient in the array of coefficients and appends the encoded first non-zero coefficient to an encoded video bitstream.

15. The system of claim 14, further comprising a variable length code table coupled to the first level encoder, wherein encoding the first non-zero coefficient in the array of coefficients comprises reading a code value from the variable length code table when the magnitude of the first non-zero coefficient is less than or equal to a threshold, and wherein encoding the first non-zero coefficient of the array of coefficients comprises executing an encoding algorithm when the magnitude of the first non-zero coefficient is greater than the threshold.

16. A system comprising:
a processor;
an encoder software system configured to execute on the processor, the encoder software system comprising a level/run before encoder configured to:
encode an array of coefficients by iteratively executing an encoding loop, wherein an iteration of the encoding loop encodes a non-zero coefficient and encodes a run of zero coefficients preceding a non-zero coefficient;
adaptively encode the non-zero coefficient based, at least in part, on the magnitude of another non-zero coefficient in the array of coefficients; and
append the encoded non-zero coefficient to an encoded video bitstream.

17. The system of claim 16, wherein the encoder software system further comprises:

a trailing ones encoder that encodes up to three one magnitude coefficients in the array of coefficients;
a coeff_token encoder that encodes a number of non-zero coefficients in the array of coefficients and encodes the number of one magnitude coefficients encoded by the trailing ones encoder;
a total zeros encoder that encodes a total number of zero coefficients located in the array of coefficients between the start of the array of coefficients and the last non-zero coefficient in the array of coefficients; and
a storage array that stores the encoded output of the trailing ones encoder, the coeff_token encoder, and the total_zeros encoder.

18. The system of claim 16, wherein the encoder software system further comprises a first level encoder that encodes a first non-zero coefficient in the array of coefficients by reading a code value from a variable length code table when the magnitude of the first non-zero coefficient is less than or equal to a threshold and wherein the first level encoder encodes the first non-zero coefficient by execution of an encoding algorithm when the magnitude of the first non-zero coefficient is greater than the threshold.

19. The system of claim 16, wherein the software system is configured to store the encoded run of zero coefficients in a storage location and append the stored encoded run of zero coefficients to the encoded video bitstream after all non-zero coefficients in the array of coefficients have been encoded and appended to the encoded video bitstream.

20. The system of claim 16 wherein:
the encoder software system further comprises a total zeros encoder that encodes a count of the total number of zero coefficients in the array of coefficients preceding the last non-zero coefficient in the array of coefficients, and stores the count of the total number of zero coefficients in a storage location, and wherein the software system is configured to
append the stored count of the total number of zero coefficients to the encoded video bitstream after all non-zero coefficients in the array of coefficients have been encoded and appended to the encoded video bitstream.

21. The system of claim 16 wherein, the processor is a very long instruction word processor.

* * * * *